United States Patent [19]
Ginsberg

[11] Patent Number: 6,064,730
[45] Date of Patent: May 16, 2000

[54] CUSTOMER-SELF ROUTING CALL CENTER

[75] Inventor: Allen Ginsberg, Jackson, N.J.

[73] Assignee: Lucent Technologies Inc., Murray Hill, N.J.

[21] Appl. No.: 08/871,445

[22] Filed: Jun. 9, 1997

Related U.S. Application Data

[60] Provisional application No. 60/019,985, Jun. 18, 1996.
[51] Int. Cl.[7] .............................. H04M 3/00; H04Q 3/64
[52] U.S. Cl. ...................... 379/265; 379/266; 379/93.17; 379/93.23
[58] Field of Search ..................................... 379/265, 266, 379/309; 345/357, 352, 353, 356; 707/501; 370/352

[56] References Cited

U.S. PATENT DOCUMENTS

| | | | |
|---|---|---|---|
| 4,653,090 | 3/1987 | Hayden | 379/204 |
| 5,465,286 | 11/1995 | Clare et al. | 379/266 |
| 5,511,112 | 4/1996 | Szlam | 379/265 |
| 5,703,943 | 12/1997 | Otto | 379/309 |
| 5,740,240 | 4/1998 | Jolissaint | 379/265 |
| 5,841,852 | 11/1998 | He | 379/265 |
| 5,884,032 | 3/1999 | Bateman et al. | 379/265 |

*Primary Examiner*—Scott Wolinsky
*Assistant Examiner*—Benny Q. Tieu

[57] ABSTRACT

A call center for routing of a call from a user to one of a plurality of agent stations of an organization, comprises: an interactive graphical display of information relating to the organization, the display for showing status information of at least one agent station; a device for enabling a user to select an agent station from the display; and, a device for effecting a communications link between the caller and the agent station. Further included is a device for receiving information about the organization and updating the graphical display of information.

18 Claims, 5 Drawing Sheets

CUSTOMER-SELF ROUTING CALL CENTER

RELATED APPLICATIONS

This application claims the benefit of provisional U.S. patent application Ser. No. 60/019,985 filed Jun. 18, 1996.

FIELD OF THE INVENTION

The present invention relates to a technique and system for one or more end users to visualize dynamic information of an organization or corporate entity. In particular, the invention enables callers to visualize information relating to an organization's people, products, structure, etc., and to enable routing of their calls to the appropriate people who can attend to their needs.

BACKGROUND OF THE INVENTION

An organization having multiple telephone stations often uses a Private Branch Exchange (PBX) for routing an incoming call from a caller, e.g., a customer, to, for example, a sales agent of the organization. FIG. 1 illustrates a conventional calling center 10 employing a PBX system for automatically routing incoming calls. As shown in FIG. 1, for any particular call placed from a customer telephone 15, there may be a human intervenor (operator) 20 who answers the call and sends it into the PBX switching system 25, which automatically routes the call to a particular call center agent 30. Alternatively, if an agent is not available, call-routing algorithms may be employed to appropriately queue an incoming call, estimate the waiting time before an agent will be free to receive the call, and route the call to the next available agent when it is at the head of the queue. Various statistics regarding incoming and outgoing calls may additionally be collected.

While sophisticated, the conventional use of a PBX to route incoming calls leaves much to be desired from the point of view of caller satisfaction. Oftentimes, the first agent to whom a call is routed does not handle matters of concern to the caller and the caller must be transferred to another agent. Sometimes more than one transfer is required. Furthermore, each transfer is often accompanied by an additional waiting period while the intended transferee agent is busy on another call, or until it is determined that the intended transferee agent is otherwise not available.

In an attempt to provide better service to callers, many automated answering services allow a caller to either directly select whether to be routed to a particular agent, e.g., by dialing an extension number or agent's name, or to wait for the next available agent. Some such answering services even announce the estimated waiting time. Additionally, in a further attempt to ease the burden of establishing the right connection, U.S. Pat. No. 5,428,608 describes a call connection technique whereby a first caller utilizing a modem that is capable of providing simultaneous voice and data communication service through a public switched network, may establish a voice connection based upon the user's data connection. Thus, a controlling device may be able to automatically establish a voice connection between a caller and an agent as determined from the context of the established data connection, i.e., the activity of the application that the user is currently engaged in. This technique, for example, is useful in the "on-line" home shopping systems.

SUMMARY OF THE INVENTION

It has been recognized that, with regard to the option of directly selecting a particular agent, even with the best automated answering services, callers do not know prior to selecting a particular extension whether the agent expected to be at that extension is actually present at that extension, or if the agent is busy with another call. Nor does the caller know how many calls are in the queue for that agent, i.e., the waiting period for that agent.

To alleviate this lack of knowledge, and so enable a caller to have his interests better served, the present invention enables a user to graphically view a representation of an organization so as to learn information, such as, the identity, status, availability, and waiting time, regarding a particular agent who is capable of addressing the user's concerns. The user can then connect to an appropriate agent. In accordance with the principles of the invention, a user first connects to a dynamic graphical display of the organization. This display may include, for example, a map of the organizational structure, and an indication of each agent and/or agent station, including whether the station is manned and the length of the particular agent's queue. The graphical display continuously receives updated information about the organization from one or more databases, which may include queue information from the organization's PBX. Upon selecting an agent to whom to be connected, a telephone link or other type of communication link is opened between the caller and the selected agent. When the user places himself on an agent's queue that information is provided to the PBX.

DETAILED DESCRIPTION OF THE INVENTION

The customer self-routing call center 100 of the invention is an interactive system providing customers with a visual presentation of an organizational structure and enabling the customer to directly route his or her call with a particular person, e.g., an agent, who is most able to address the customer's needs or concerns. Particularly, the system provides the user with call-routing options in the form of a dynamic visual display and enables the customer to navigate through the display to establish a direct audio/visual communication link with an agent of the customer's choice. Thus, the system provides relevant information about the organization's agents, e.g., what the agent's skill area is, so that the customer could make an intelligent choice. If the agent the customer wishes to communicate with is unavailable, a visual representation of that agent's queue will be dynamically provided to the customer, in addition to other relevant statistical information such as, how long that agent's queue is, how fast that agent's queue is moving, and what the expected waiting time is. Additionally, the system provides the customer with a choice of whether or not to place his/her name on the agent's queue or to leave a message for the agent.

Besides the above-described call-routing options, the inventive system 100 is used to provide a dynamic visualization of the organization, and particularly, how functional aspects of the organization changes over time. For instance, an agent or other member of the organization can visualize the progress of workflow as it proceeds through the organization. Also, a customer can visualize where an order that he/she has submitted is currently residing in the organization, as well as visualize how it got there.

Figure 1:
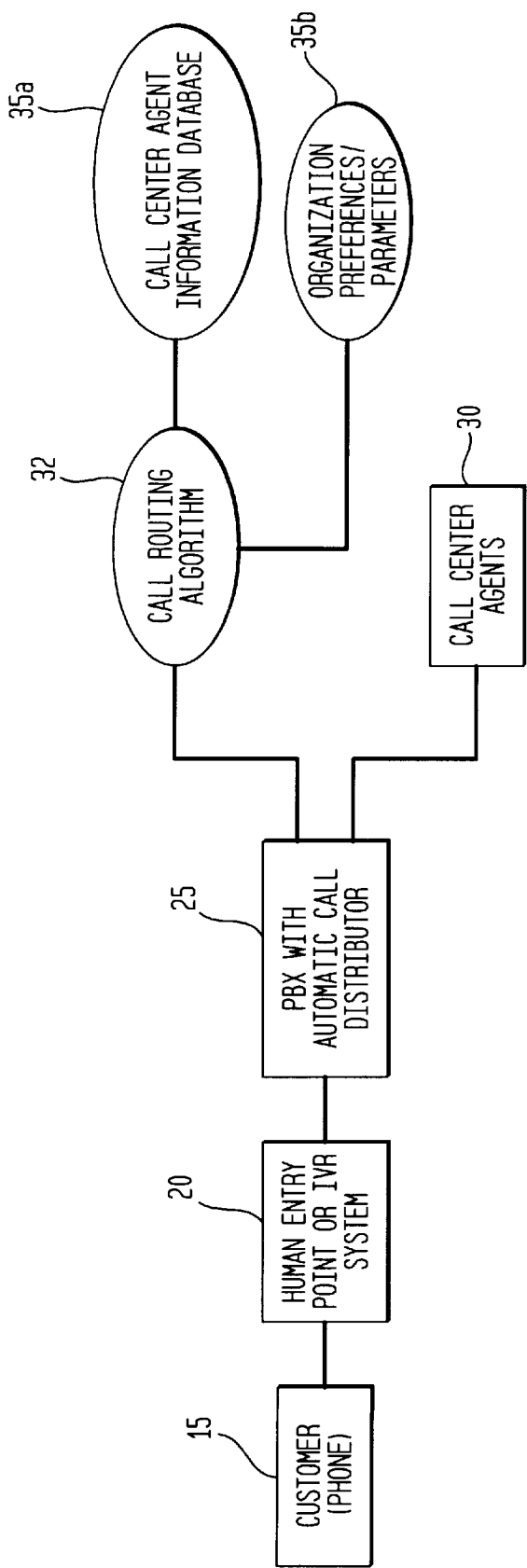
FIG. 1 illustrates the architecture of a prior art call center.
Figure 2:
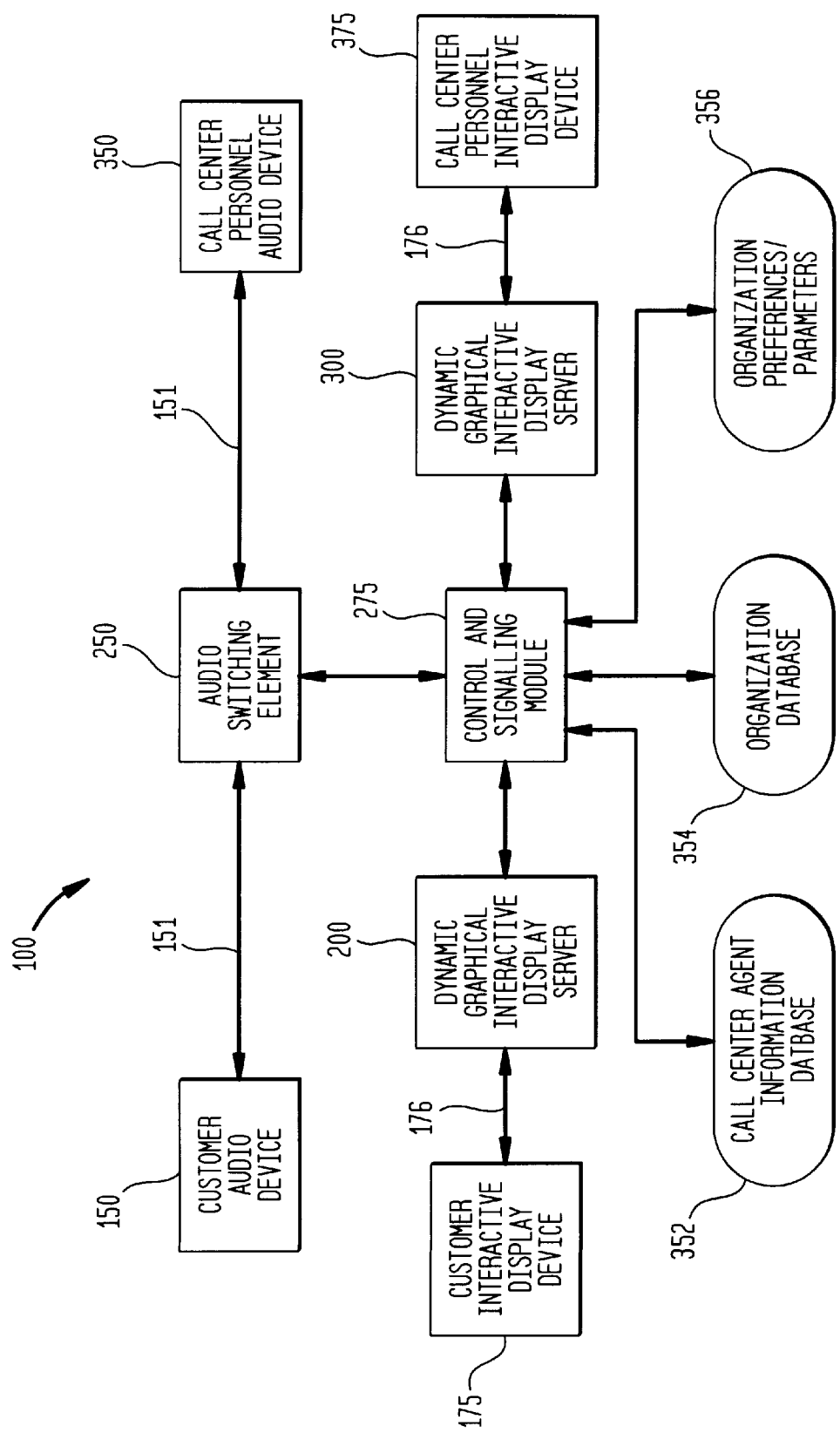
FIG. 2 illustrates the architecture of the self-routing call center of the present invention.
Figure 3:
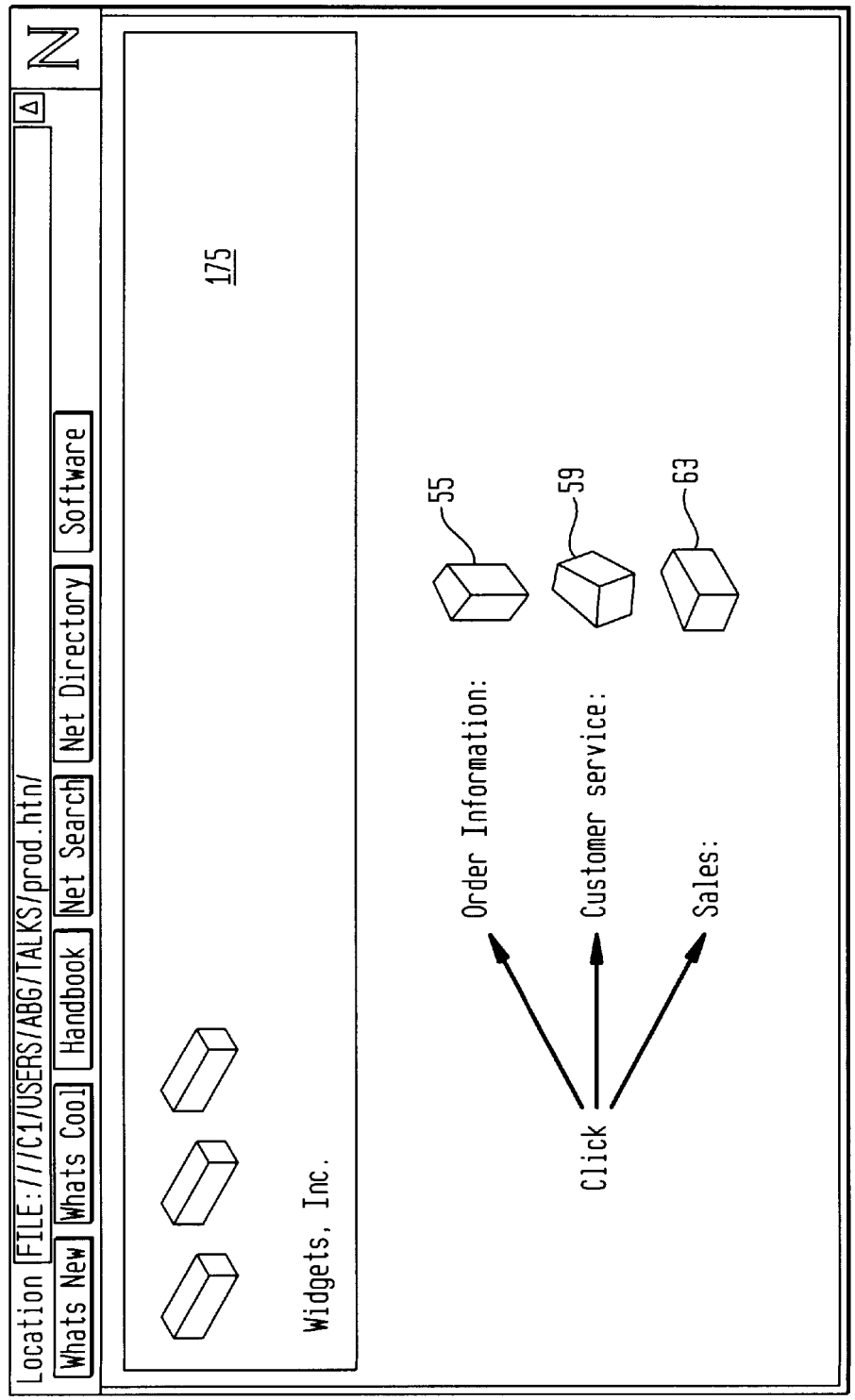
FIG. 3 is an example graphical display showing customer self-routing call center options of the present invention.

As shown in FIG. 2, the system consists of adding several new modules to the existing generic call center components described above with respect to FIG. 1. Particularly, as shown in FIG. 2, a "call" placed into the system 100 originates from the customer's interactive display device, e.g., a computer/display device 175. Although not shown, the customer end computer/display system is provided with a widely used Internet browser program, such as, e.g., Netscape Navigator® (trademark of Netscape Communications Corporation) or Internet Explorer® (trademark of Microsoft Corp.) through which the user, via a network service provider (not shown), initiates a communication to the desired organization or corporate entity to whom the customer wishes to contact. Once contact is made with the desired organization, the organization's dynamic graphical interactive display server 200 provides the customer with a dynamic, navigable, graphical display of the organization's structure including, but not limited to: visual presentation of call center services, personnel, i.e., agents, and a visual presentation of each agent's queue status. Essentially, the organization's interactive display server 200 downloads software, e.g., in the form of so-called "applet" (not shown), that generate the navigable interactive display at the customer's terminal. Preferably, the applet for generating the display may be programmed in a graphics programming interface language, such as, e.g., Java® (trademark of Sun Microsystems) running on top of, for example, the Navigator®. Particularly, the applet generates an abstract visual map of the organization's call center. In the case of a commercial enterprise, for example, an initial map provided for the customer's interactive display device 175 may appear as shown in the non-limiting, illustrative example in FIG. 3, which depicts icons representing call-center areas such as "Product Ordering," shown as icon 55, "Product Support and Customer Service", shown as icon 59, and "Sales", shown as icon 63. A mouse device (not shown) may be utilized by the customer to click on the icon of the call-center area with which he would like to establish contact. For instance, if the customer selected the "Product Ordering" icon 63, applets will generate a new display map at the customer's interactive terminal 175 that presents, for example, a list of products or product categories, and associated agents. The granularity will depend upon the breadth and depth of the organization's business ventures. At some point, after drilling down visualizations of the organization from the interactive navigable graphical display 175, the customer will finally be presented with one or more "virtual rooms" associated with agents that pertain specifically to his/her needs. In a virtual room, the customer will see graphic representations of the call center agents, their associated skills, and some representation of the number of customers waiting on that agent's queue. Alternatively, there might only be one queue per virtual room, and the user would see a representation of that queue. The customer may additionally be provided with a room to receive text or visual information representing, e.g., the status of his/her sales order, etc.

As shown in FIG. 2, the control and signaling module 275 provides the mechanism whereby the state of the various call center queues may be recorded, updated, and made accessible to the customer via the graphical display server 200. Specifically, control and signaling module 275 obtains the call center status information from the call center 250, which is an audio switching element having call queuing features, e.g., a private branch exchange (PBX), Internet based switch, or conventional telephone switch, and, additionally, is provided with various database information from the organization databases shown in FIG. 2, in order to instruct the graphical display server 200 to display the appropriate set of "virtual rooms" and call center status information for customer display in accordance with the structure, needs, and preferences of the organization. For purposes of this description, PBX is defined to include any means for effecting any communications, including but not limited to: 1) conventional circuit switched telephony, and 2) packet based telephony, between the extensions of the private telephone or computing system and remote user; and including: i) a conventional private branch exchange or switching system, ii) a multimedia communication exchange, and iii) a wireless or wired computer/ telephony integrated system.

The control module additionally performs control/signaling functions. For example, when a customer decides to put him/herself on a queue, the customer initiates queue entry from the customer's interactive display device and control module 275 sends the appropriate signals to the audio switching element 250 to place the customer on the call center agent's queue. If the agent is currently available, the control and signaling module 275 will enable the switching element 150 to establish a communication link from the customer's telephone, or like audio device 150, with that agent via audio carrier 151. Such a link may be, for example, plain old telephone service lines or Internet based packet communication. Alternatively, the control and signaling module 275 enables communication of text or video information along a data carrier 176, e.g., a modem or Internet based switch, to the agent's interactive display device or computer terminal 375.

Figure 4:
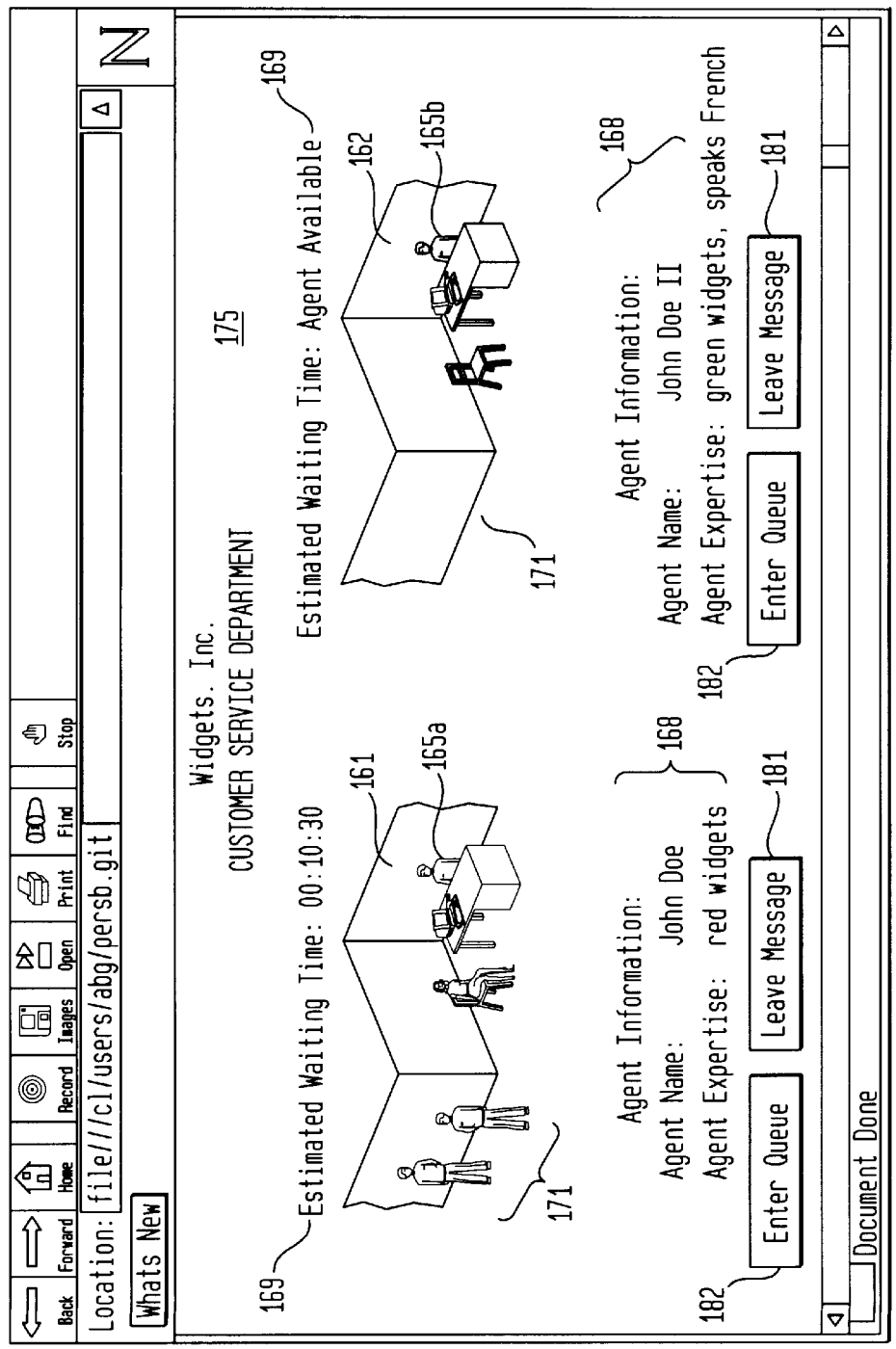
FIG. 4 is an example graphical display showing two virtual rooms provided respectively, with agents, associated queues, and indications of agent availability.

More particularly, as shown in the non-limiting example of FIG. 4, the interactive display server 200 will generate a display at the customer's display device of one or more virtual rooms, e.g., rooms 161 and 162, pertaining to the customer's needs. Each virtual room 161, 162 is a graphical representation of the call center agent 165a and 165b, respectively, and contains information for the customer about the agent's associated skills, e.g., at information display field 168, the customer's estimated wait time displayed at display field 169, and, a graphical representation of the number of customers waiting on a particular agent's queue, indicated on the display as area 171. If the desired agent is unavailable, the control and signaling module 275 will provide instructions enabling display server 200 to generate an icon or display item, e.g., button 181, as shown in FIG. 4, for manipulation by the customer to enable the customer to leave an audio message for receipt by the agent via audio call center switching element 250, or a text message for receipt by the particular agent's display device 375 through the organization's dynamic graphical interactive display server 300 (FIG. 2). Likewise, the agent will be able to leave text, audio or visual messages in virtual rooms created by the customer (not shown) and displayed at the call center agent's interactive display device 375. Such text, audio or visual messages may be accessed later by the customer at the customer's display device 175.

In the example illustration of FIG. 4, there may be virtual rooms 161, 162 representing, e.g., customer service, or any other of the organization's service departments pertaining to, e.g., product orders, returns, information, and the like. In each room, there would be an agent 165*a,b* assigned, and when the particular agent logs onto the system, the agent will "appear" in the particular room 161,162 representing the particular service in the agent's skill area, e.g., customer service. Furthermore, as shown in FIG. 4, the agent's skills will be displayed in display field 168, such that a customer only concerned with red widgets, for example, will know to contact agent 165*a* and wait on the queue 171 associated with the virtual room 161. Likewise, a customer interested in green widgets, or, a French-speaking customer, will be able to contact agent 165*b* in room 162 as an indication is provided in display field 169 that agent 165*b* having those skills, is currently available. Thus, a customer calling in to the call-center, will see that particular room is manned and may make contact accordingly. Besides ascertaining the agent's availability, the customer will also see a representation of the estimated wait time for that agent's queue, as shown in display field 169. Control module 275 and interactive display server 200 will generate a queue icon, e.g., button 182, in FIG. 4, enabling the customer to enter himself on that agent's queue 171 and, will additionally generate a graphical representation on the customer's display that the customer has entered the queue 171. Alternatively, if the customer does not want to wait, the customer may click button 181 allowing him to leave a message or voice mail either to a specific agent or, to a virtual room containing a number of agents.

As mentioned above, the call queue structure employed by an organization for presentation to the customer is generated from the information contained in the various databases shown in the FIG. 2. Particularly, the Call Center Agent Information Database 352 provides control and signaling module 275 with information pertaining to the available agents in, e.g., a particular product area; the Organization database 354 provides control and signaling module 275 with information pertaining to organizational features of the called entity, and the Organization preference/parameter database 356 provides control and signaling module 275 with certain types of organizational information according to the status of the customer. For example, a preferred customer may view certain information not privy to a first-time caller, or, a high-end customer calling in may want to be presented with only one or two agents that that customer likes to deal with.

As described herein, the call-center's control and signaling module 200 and interactive graphical display server will always provide the customer with updated information about the organization, and particularly, its structure. Server push schemes and/or separate graphics interfaces that run on top of the browser programs, Navigator®, may be implemented to provide continuous updated visual information for the customer with regard to, e.g., queue waiting time, etc. As the structure of the organization changes, e.g., new agents or product areas added, etc., resulting in changes to the databases 352, 354 and 356, the visual representations provided to the customers will accordingly change. Thus, for example, control and signalling module 275 may initiate the generation of a visual display for the customer representing that a new agent has been added to handle a new product line.

Furthermore, in accordance with the principles of the invention, other established organizational databases, e.g., a legacy database, may be integrated with the call-center's control and signaling module 200 to provide other types of information for the customer and/or agent through his/her interactive display device. Thus, for example, a customer or an agent may map the progress of that customer's sales order. Additionally, all transactions conducted through the self-routing call-center are recorded and made available so that the history of all virtual rooms may be reconstructed. In this way, an agent or supervisor will be able to visualize when an order was placed and to which agents and departments handled the order.

Figure 5:
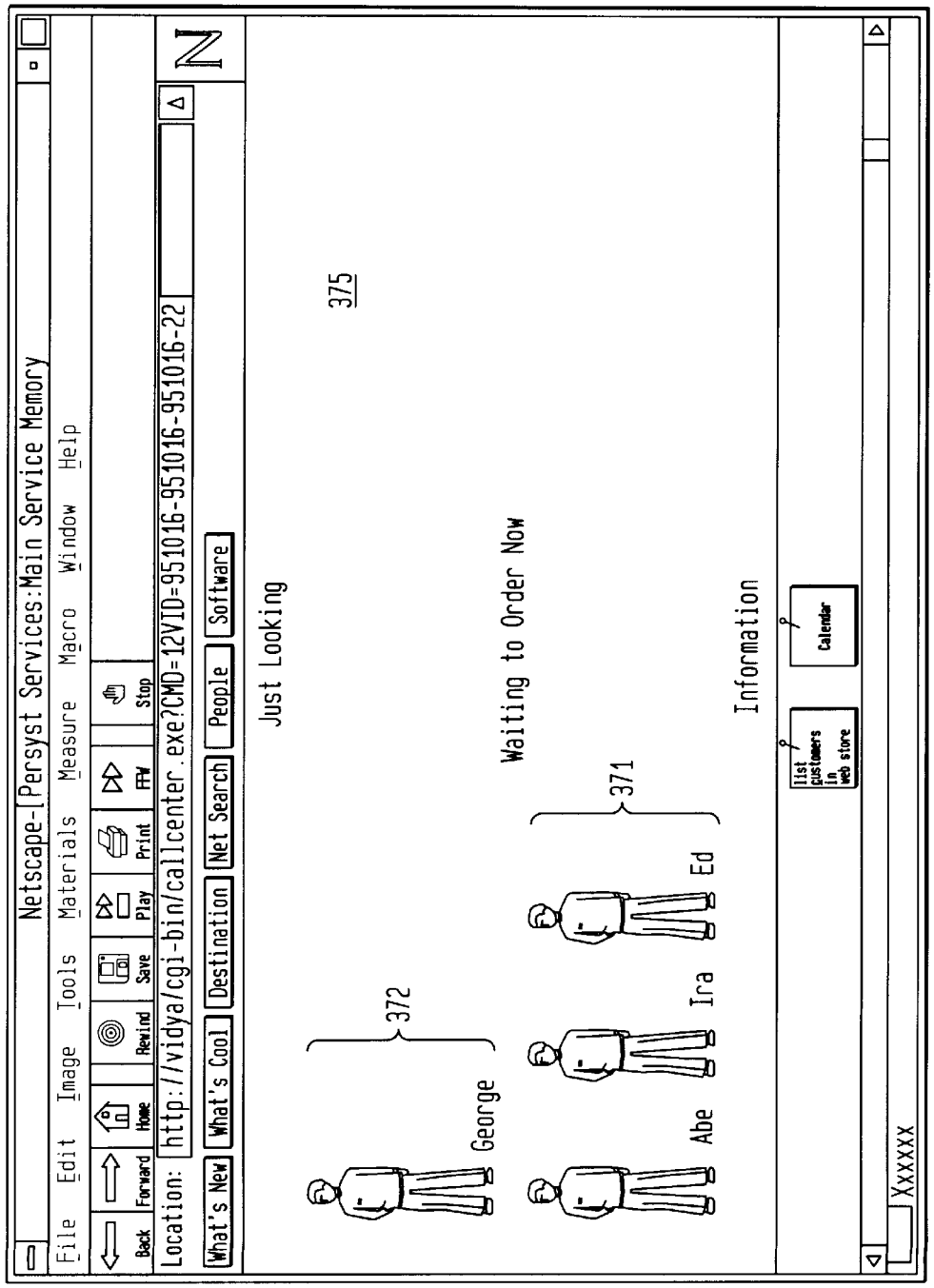
FIG. 5 is an example graphical display showing call center options for use by the organization.

The control and signaling module 200 further contains mechanisms for enabling user manipulation of queues. For example, intra-organization text/message dump feature may be implemented whereby a manager, desiring to communicate a memo to each of his underlings or to upper-management personnel, may click each of the queues of the organizational display representing those persons to whom he wishes to communicate, and execute a command to dump a communication, e.g., audio message or text file, to each of those persons instantaneously. Other manipulation features provided by the control and signaling module 200 include add/drop capability, i.e., adding or removing an item from the queue; interrupt capability, wherein the user may interrupt an occupied queue in extreme situations, or, specify the scheduling/timing of information delivery to/from queues. Furthermore, specialized queues (virtual rooms) may be established. For example, as shown in FIG. 5, the control and signaling module 275 may provide the interactive graphical display server 300 with instructions for generating a display to be downloaded to a supervisor's interactive display device 375. For example, a display for a supervisor within the organization can be provided with, e.g., the identity of the customers and their queue status, e.g., those customers wishing to place a sales order, as depicted in display field 371, or status information of those customers just browsing the product catalogue, for example, as depicted in display field 372. With such knowledge, appropriate management decisions may be undertaken as the supervisor may decide, e.g., a) to increase the number of available of sales agents in that particular product area, b) generate an alarm condition when an unusually large number of customers are waiting in a queue, or c) assign a specific agent to a preferred customer that is waiting. Furthermore, the control and signaling module 275 will enable increased user involvement within an organization, department, etc. For example, a queue may be established whereby users may "have a say" in some departmental meeting of the organization that is taking place, particularly, by calling into the center 100 via interactive display device 375 and entering him/herself into a designated queue or room and wait until its time to speak to, or leave a message, for example.

The foregoing merely illustrates the principles of the present invention. Those skilled in the art will be able to devise various modifications, which although not explicitly described or shown herein, embody the principles of the invention and are thus within its spirit and scope.

What is claimed is:

1. A call center for routing of a call from a caller to one of a plurality of agent stations of an organization, comprising:

means for generating a graphical display of information relating to said organization and for presenting the graphical display to said caller, said information relating to said organization including status information of at least one agent station;

means for updating said status information and said graphical display;

means for enabling said caller to select an agent station; and means for effecting a communications link between said caller and an agent station selected by said caller.

2. A call center according to claim 1, wherein said communications link is for voice signals.

3. A call center according to claim 1, wherein said means for enabling a caller to select an agent station employs a graphical user interface.

4. A call center according to claim 1 wherein said information relating to said organization includes said organization's organizational structure.

5. A call center according to claim 1 wherein said status information of at least one agent station includes an indication of whether said at least one agent station is manned by an agent.

6. A call center according to claim 1 wherein said status information includes functions performed by an agent at said at least one agent station.

7. A call center according to claim 1 wherein said status information of at least one agent station includes the size of said at least one agent station's caller queue.

8. A call center according to claim 1 wherein said graphical display of information includes display of a room and waiting queue associated with said at least one agent station, further including means for placing said caller on said queue associated with said at least one agent station.

9. A call center according to claim 1 wherein said means for effecting a communications link includes means responsive to said caller's selection for signaling said organization's audio communication network of said caller's selection.

10. A dynamic self-routing call center, comprising:

means for generating a graphical navigable display of information relating to an organization and for presenting the graphical navigable display to a caller, said information being organized into virtual rooms, with each virtual room being associated with an agent capable of handling a particular task for said organization;

means for updating said information and said graphical navigable display;

input means by which said caller can access and select said virtual rooms based on qualifications of said associated agent; and, means for effecting a communications link between said caller and said associated agent.

11. A method for use by a caller to make a call to a selected agent station of an organization, comprising:

displaying to said caller information on a graphical display, said information including a status of at least one agent station and further including information usable by said caller to determine which of said displayed agent stations are of interest to said caller;

continuously updating the displayed status;

receiving said caller's selection indicating said selected agent station;

signaling the organization's audio communication network with said caller's selection; and establishing a communications link between said caller and said selected agent station.

12. A method for use by a caller according to claim 11, wherein said established communications link is for voice signals.

13. A method for use by a caller according to claim 11, wherein said link is established by said audio communication network.

14. A call-routing system for enabling communication between a caller and an agent of an organization, said agent capable of handling a particular task for said caller, said agent associated with a first agent station said call-routing system comprising:

a graphical display server provided by said organization to enable information relating to said organization to be graphically presented to said caller, said information including current status information of one or more agent stations of said organization and usable by said caller to determine which of said one or more agent stations are of interest to said caller;

a receiver for receiving information a transmission of which was initiated by said caller, said information the transmission of which was initiated by said caller indicating a selection of said first agent station by the caller; and, a link carrying control signals for initiating an establishment of a connection between said caller and said first agent station in response to said caller's selection.

15. A call-routing system according to claim 14, further including an audio communications switch responsive to said control signals for establishing a connection for voice signals.

16. A call-routing system according to claim 14, further including an interactive display device for use by said agent, said control signals enabling establishment of a connection for data signals.

17. A call-routing system according to claim 14, further including a device for updating said information relating to said organization from information stored in a database.

18. A call-routing system according to claim 14, wherein said information relating to said organization includes functions performed by said agent at said first agent station.

* * * * *